US 9,619,427 B2

(12) United States Patent
Mishra et al.

(10) Patent No.: US 9,619,427 B2
(45) Date of Patent: *Apr. 11, 2017

(54) HYBRID VIRTUAL GPIO

(71) Applicant: QUALCOMM Incorporated, San Diego, CA (US)

(72) Inventors: Lalan Jee Mishra, San Diego, CA (US); Richard Dominic Wietfeldt, San Diego, CA (US); Mohit Kishore Prasad, San Diego, CA (US); James Lionel Panian, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

This patent is subject to a terminal disclaimer.

(21) Appl. No.: 14/533,431

(22) Filed: Nov. 5, 2014

(65) Prior Publication Data

US 2015/0301979 A1    Oct. 22, 2015

Related U.S. Application Data

(60) Provisional application No. 61/982,286, filed on Apr. 21, 2014.

(51) Int. Cl.
| | |
|---|---|
| *G06F 9/44* | (2006.01) |
| *G06F 13/42* | (2006.01) |
| *G06F 13/40* | (2006.01) |
| *G06F 15/76* | (2006.01) |
| *G06F 9/54* | (2006.01) |

(52) U.S. Cl.
CPC .......... *G06F 13/4252* (2013.01); *G06F 9/444* (2013.01); *G06F 9/546* (2013.01); *G06F 13/4022* (2013.01); *G06F 13/4068* (2013.01); *G06F 15/76* (2013.01); *G06F 2015/761* (2013.01)

(58) Field of Classification Search
None
See application file for complete search history.

(56) References Cited

U.S. PATENT DOCUMENTS

| | | |
|---|---|---|
| 7,260,660 B1 | 8/2007 | Nekl |
| 7,844,945 B2 | 11/2010 | Bhagia et al. |
| 9,129,072 B2 * | 9/2015 | Mishra ................ G06F 13/4273 |
| 2002/0091826 A1 | 7/2002 | Comeau et al. |
| 2003/0061431 A1 | 3/2003 | Mears et al. |
| 2014/0108679 A1 * | 4/2014 | Mishra ................ G06F 13/4273 710/30 |
| 2014/0189174 A1 | 7/2014 | Ajanovic et al. |

OTHER PUBLICATIONS

International Search Report and Written Opinion—PCT/US2015/026033—ISA/EPO—Jul. 16, 2015.

* cited by examiner

*Primary Examiner* — Cheng-Yuan Tseng
(74) *Attorney, Agent, or Firm* — Haynes and Boone, LLP

(57) ABSTRACT

A finite state machine is provided that both serializes virtual GPIO signals and messaging signals and that deserializer virtual GPIO signals and the messaging signals. The finite state machine frames the serialized virtual GPIO signals and messaging signals into frames each demarcated by a start bit and an end bit.

22 Claims, 11 Drawing Sheets

HYBRID VIRTUAL GPIO

RELATED APPLICATION

This application claims the benefit of U.S. Provisional Application 61/982,286, filed Apr. 21, 2014.

TECHNICAL FIELD

This application relates to general purpose input/output (GPIO), and more particularly to an integrated circuit configured to use a pair of pins as virtual GPIO pins.

BACKGROUND

General purpose input/output (GPIO) enables an integrated circuit designer to provide generic pins that may be customized for particular applications. For example, a GPIO pin is programmable to be either an output or an input pin depending upon a user's needs. A GPIO module or peripheral will typically control groups of pins which can vary based on the interface requirement. Because of the programmability of GPIO pins, they are commonly included in microprocessor and microcontroller applications. For example, an applications processor in mobile devices may use a number of GPIO pins to conduct handshake signaling such as inter-processor communication (IPC) with a modem processor.

With regard to such handshake signaling, a sideband signal is deemed as "symmetric" if it must be both transmitted and received by a processor. If there are n symmetric sideband signals that need to be exchanged, each processor requires n*2 GPIOs (one GPIO to transmit a given signal and one GPIO to receive that signal). For example, a symmetric IPC interface between a modem processor and an application processor may comprise five signals, which translates to 10 GPIO pins being necessary for the resulting IPC signaling. The need for so many GPIO pins for IPC communication increases manufacturing cost. Moreover, devoting too many GPIOs for IPC limits the GPIO availability for other system-level peripheral interfaces. The problem cannot be solved by moving the IPC communication onto the main data bus between the processors in that certain corner conditions are then violated.

In addition to GPIO signals, it is conventional for a processor to message with external devices such as through an SPI bus having a dedicated transmit pin and receive pin. In contrast to a GPIO signal, such a messaging signal is not dedicated to a particular pin. In other words, assorted messages may be transmitted over the dedicated messaging transmit pin. The receiving device, a priori, does not know what the messaging pertains to in contrast to a GPIO signal—the GPIO signal is dedicated to a particular GPIO pin so the fact that the GPIO signal is received on the corresponding GPIO pin identifies it to the processor. But that is not the case for a messaging signal. Such signals have address bits that the processor uses to route the received messaging signal to the appropriate register. Upon registration, the processor must then interpret the registered message. The resulting need for a dedicated messaging transmit pin and a dedicated messaging receive pin adds significantly to manufacturing cost.

Accordingly, there is a need in the art for a hybrid GPIO and messaging architecture that can accommodate numerous input/output signals without requiring an excessive number of pins.

SUMMARY

A hybrid virtual GPIO architecture is provided for communication between two integrated circuits each having a processor. This architecture is deemed as "hybrid" in that it accommodates both GPIO signals and messaging signals. As discussed earlier, a GPIO signal in a conventional GPIO system is dedicated to a particular pin. The receipt of the GPIO signal on the corresponding GPIO pin identifies the signal to the receiving processor. But a messaging signal is received on a dedicated receive pin such as in the serial peripheral interface (SPI) or an inter process communication (IPC) interface. Assorted messaging signals may thus be received on the same dedicated receive pin. To distinguish between messaging signals, it is conventional that the messaging signals include an address header containing an address. The receiving processor routes the received message to an appropriate register based upon the address. For example, one type of message may relate to the identity of an installed card such as a wireless card or a GPS card. Such a message would then have an address that maps to an appropriate register so that corresponding message content may be registered accordingly. By interpreting the resulting contents of the register, the processor can then interpret the identity of the installed cards. Other types of messages would be routed to the appropriate registers in an analogous fashion.

In the hybrid GPIO interface disclosed herein, the messaging signals are transmitted over the same dedicated transmit pin that carries the virtual GPIO signals. The number of virtual GPIO signals and the number of messaging signals may be customized for a given transmitting and receiving processor pair. A handshaking protocol is disclosed so that the processors in their respective integrated circuits may both be apprised of the number of virtual GPIO and messaging signals. Each integrated circuit also includes a hybrid GPIO interface for communicating with the remote processor using a set of signals. This set of signals comprises a set of GPIO signals, a set of virtual GPIO signals, and one or more messaging signals. Each integrated circuit thus includes a set of GPIO pins corresponding to the set of GPIO signals. These GPIO pins are used to transmit the set of GPIO signals in a conventional manner as known in the GPIO arts.

In contrast to the set of GPIO signals, the set of virtual GPIO signals and the messaging signals are not transmitted over GPIO pins. Instead, each integrated circuit transmits and receives the set of virtual GPIO signals and the messaging signals using a dedicated transmit pin and a dedicated receive pin. In that regard, the set of virtual GPIO signals comprises a transmit set and a receive set. A finite state machine (FSM) in each integrated circuit is configured to serially transmit the transmit set to the remote processor through the dedicated transmit pin. The finite state machine is further configured to serially receive the receive set of virtual GPIO signals from the remote processor over the dedicated receive pin.

The messaging signals may comprise any type of signal that is ordinarily transmitted over a dedicated bus that is shared by the various messaging signals. For example, a messaging signal may comprise an inter-integrated circuit (I2C) signal used for initial configuration of a processor. Just like the virtual GPIO signals, the messaging signals may be divided into a transmit set and a receive set. The FSM serially transmits the messaging signal transmit set using the dedicated transmit pin and serially receives the messaging signal receive set using the dedicated receive pin.

The processor provides a first set of signals to the hybrid GPIO interface. From the hybrid GPIO interface, a portion of the first set of signals are transmitted to the remote processor as a first set of GPIO signals over a first set of corresponding GPIO pins. A remaining portion of the first set of signals from the processor is provided by the hybrid GPIO interface in parallel to the FSM. Depending upon the content of the remaining portion (GPIO vs messaging signal), the FSM can then serially transmit the remaining portion as the transmit set of virtual GPIO signals over the dedicated transmit pin.

The hybrid GPIO interface also receives a second set of GPIO signals from the remote processor over a second set of corresponding GPIO pins. Depending upon the mode of operation, the FSM serially receives the receive set of virtual GPIO signals or the receive set of messaging signals from the remote processor and provides the receive set in parallel to the hybrid GPIO interface.

There are two main embodiments for the disclosed hybrid virtual GPIO architecture. In a first embodiment, each frame transmitted over the dedicated transmit pin includes a header that identifies whether the frame comprises a transmit set of virtual GPIO signals or a transmit set of messaging signals. The header may also indicate the corresponding frame will identify the vGPIO stream length to be set on the receiver side or indicate an acknowledgement of the desired vGPIO stream length. The frame size is thus variable and determined by the resulting stream-length-determining frame. In a second embodiment, the header is extended for a frame that includes both virtual GPIO signals and messaging signals such that the extended header identifies the bit positions of the virtual GPIO signals and the messaging signals. The hybrid GPIO interface can then provide a second set of signals to the receiving processor that comprises the second set of GPIO signals and messaging signals from the remote processor.

The FSM transits the transmit set of virtual GPIO signals and messaging signals in framed that are each demarcated by a start bit and an end bit. The FSM in a remote processor thus receives the transmitted frames as its receive set of virtual GPIO signals and messaging signals. By monitoring whether it receives a complete frame including both the start bit and the end bit, an FSM for one processor can detect whether the remote processor has failed.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
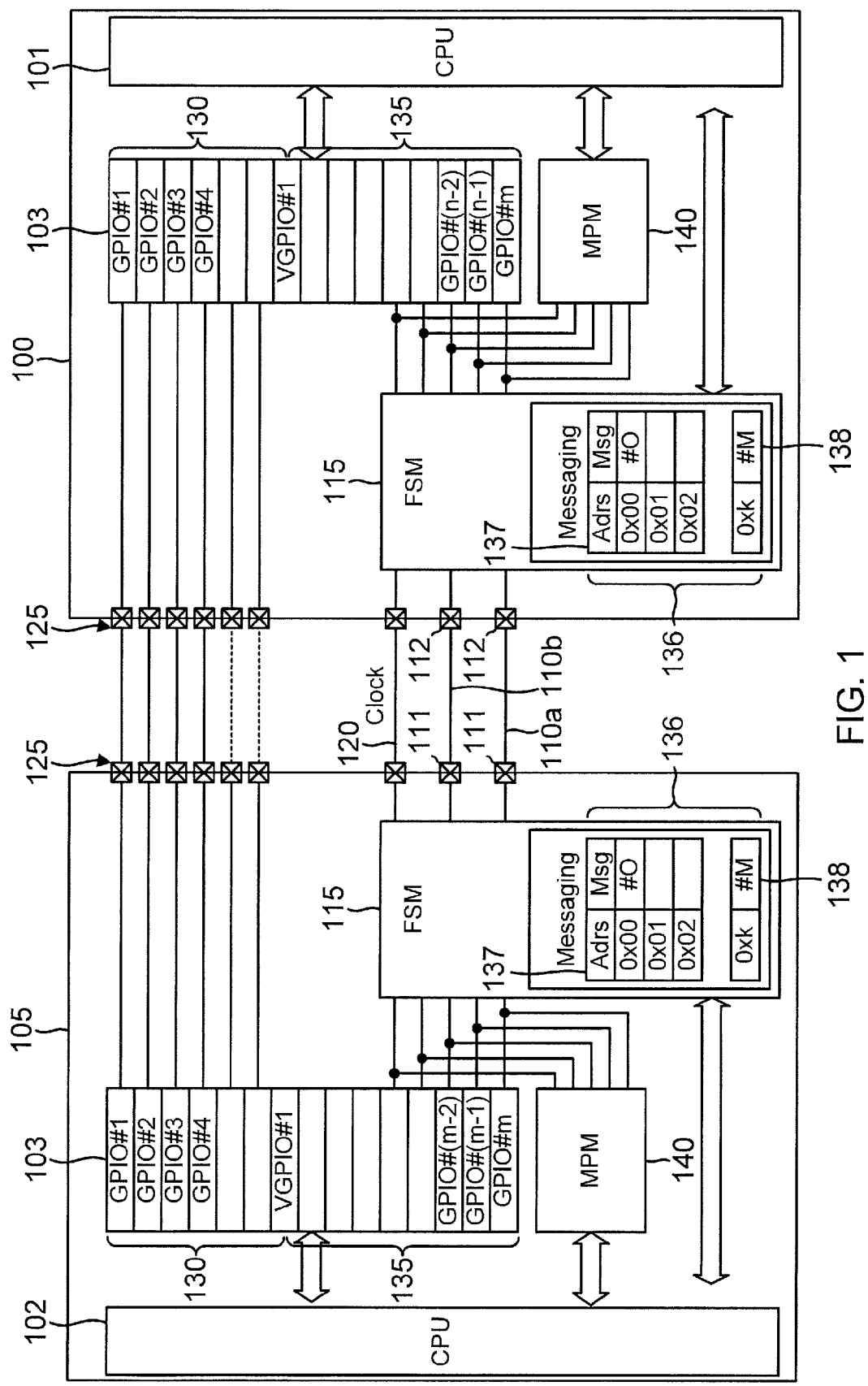
FIG. 1 is block diagram of an example hybrid virtual GPIO architecture.

A hybrid virtual general purpose input/output (GPIO) architecture is provided that enables a system to use a pair of pins as if they constituted a larger plurality of GPIO pins and a dedicated transmit pin and a dedicated receive pin for messaging signals. As used herein, "messaging signals" refer to signals that would conventionally be transmitted over a dedicated transmit pin such as practiced in the IPC or SPI protocols. Messaging signals thus include an address so that the receiving processor may route the received messaging signal to the appropriate register. The hybrid virtual GPIO architecture is deemed as "virtual" in that, to the system-level applications creating the virtual GPIO signals, it is as if those virtual GPIO signals were being accommodated for input/output on conventional GPIO pins. In other words, a system on chip (SoC) or processor having the virtual GPIO architecture disclosed herein experiences no functional difference between GPIO signals and virtual GPIO signals. However, only two pins are used to transmit and receive the virtual GPIO signals that would otherwise each need their own dedicated pair of GPIO pins (if the GPIO signal is symmetric). The hybrid virtual GPIO architecture is deemed as "hybrid" in that dedicated transmit pin that is used to transmit the virtual GPIO signals is also used to transmit the messaging signals to a remote processor. Similarly, the dedicated receive pin that is used to receive the virtual GPIO signals is also used to receive the messaging signals from the remote processor.

The virtual GPIO signals disclosed herein will be discussed with regard to accommodating IPC between an applications processor and a modem processor in a mobile telephone or other communication device. However, it will be appreciated that the virtual GPIO circuits and techniques disclosed herein are widely applicable to system on chip (SoC) or application specific integrated circuits (ASICs) requiring GPIO capabilities.

The disclosed hybrid virtual GPIO architecture makes the health of the transmitting node transparent to the receiving node. This is an important advantage, particularly during the debugging stage for software implementation as it indicates to the receiving processor the time that a transmitting processor became inoperative. To enable such a robust virtual GPIO capability, each integrated circuit includes a dedicated transmit pin coupled to transmit line on the circuit board and a dedicated receive pin coupled to a receive line of the circuit board. In that regard, the virtual GPIO signals may be divided into a transmit set for transmission over the transmit line and a receive set for reception on the receive line. If the signaling is symmetric, the number of signals in the transmit set for each processor is the same. However, the hybrid virtual GPIO architecture disclosed herein can accommodate asymmetric signaling in which the transmit set of virtual GPIO signals for one processor is not the same size as the transmit set for a remote processor. Analogous to the virtual GPIO signals, the messaging signals are also transmitted over the dedicated transmit pin and received on the dedicated receive pin.

Turning now to the drawings, FIG. 1 illustrates a hybrid virtual GPIO architecture 101 including an application processor integrated circuit 100 and a modem processor integrated circuit 105 within a mobile telephone or other communication device. Since each integrated circuit couples to a dedicated transmit line and a dedicated receive line, a transmit line 110a for application processor integrated circuit 100 is thus the receive line for modem processor integrated circuit 105. Similarly, a transmit line 110b for modem processor integrated circuit 105 is the receive line for application processor integrated circuit 100. These lines or leads are carried on a circuit board or other physical interconnect between the integrated circuits 100 and 105. Each integrated circuit includes a dedicated transmit pin 112 to couple to the corresponding transmit line (e.g., line 110b for modem processor integrated circuit 105). Similarly, each integrated circuit includes a dedicated receive pin 111 to couple to the corresponding receive line (e.g., line 110a for modem processor integrated circuit 105). A finite state machine (FSM) 115 in each integrated circuit controls the transmission and reception using these dedicated lines and pins with regard to an external clock signal 120 from an external clock source such as a 32 KHz sleep clock.

Application processor integrated circuit 100 includes a processor 101. Similarly, mode processor integrated circuit 105 includes a processor 102. Each processor couples through a GPIO interface 103 with which it interfaces with GPIO pins 125 in a conventional fashion. A certain portion of the signals processed through each hybrid GPIO interface 103 may be transmitted and received on conventional GPIO pins 125 as conventional GPIO signals 130. But a remaining portion of the signals processed through GPIO interface 103 are not transmitted or received through conventional GPIO pins 125. Instead, some of this remaining signal portion comprises a plurality of virtual GPIO signals 135 that are transmitted and received through the corresponding FSM 115 using a dedicated transmit pin and a dedicated receive pin. Each FSM 115 also interfaces directly with the corresponding processor with regard to receiving and transmitting messaging signals 136. Since messaging signals 136 are not GPIO signals, they do not couple through GPIO interfaces 103. Each FSM 115 transmits and receives messaging signals 136 through its dedicated transmit pin 112 and receive pin 111. These pins are thus "hybrid" pins in that they are used for both virtual GPIO signals 135 and messaging signals 136.

Virtual GPIO signals 135 do not each have their own dedicated pins as is the case for conventional GPIO signals 130. This is quite advantageous in that hybrid virtual GPIO architecture 101 achieves a significant reduction of pins as compared to a conventional GPIO embodiment in which virtual GPIO signals 135 would each require their own pin. Messaging signals 136 would conventionally require another dedicated transmit pin and another dedicated receive pin as well. But these additional pins are also eliminated in the advantageous hybrid virtual GPIO architecture of the present matter.

Figure 2A:
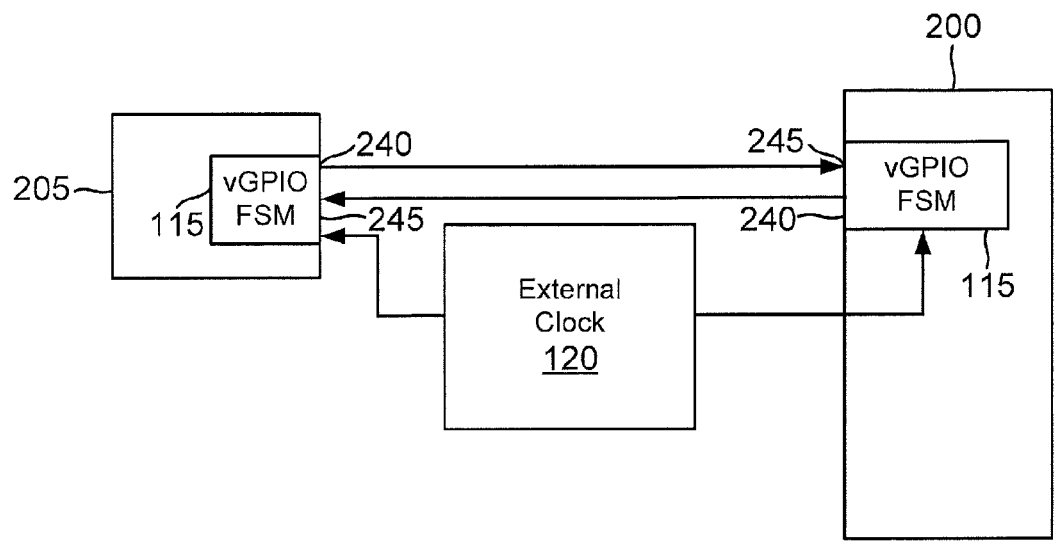
FIG. 2A is a high-level block diagram for a hybrid virtual GPIO architecture in which a processor communicates with a single remote processor.
Figure 2B:
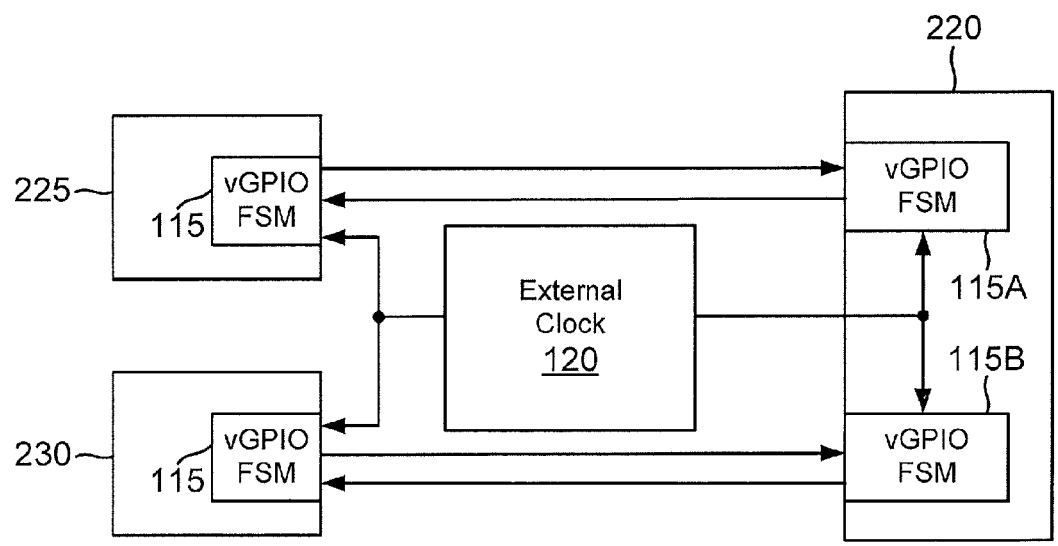
FIG. 2B is a high-level diagram for a hybrid virtual GPIO architecture in which a processor communicates with two remote processors.

An integrated circuit may include just one FSM 115 or may include a plurality of these elements for interfacing with multiple external systems. FIG. 2A illustrates a hybrid virtual GPIO architecture in which an integrated circuit 200 includes a single FSM 115 for communicating with a remote processor in an integrated circuit 205, which includes its own FSM 115. In contrast, an integrated circuit 220 shown in FIG. 2B includes an FSM 115A and an FSM 115B for communicating with remote processors in integrated circuits 225 and 230, respectively. In that regard, a system on a chip (SoC) such as the processors discussed herein may be configured with as many FSMs as is necessary to accommodate hybrid virtual GPIO signaling with other SoCs. Regardless of the number of FSMs a processor may have, each FSM communicates using its own dedicated transmit pin 240 and a receive pin 245 as indicated in FIG. 2A.

Referring again to FIG. 1, because virtual GPIO signals 135 are accommodated using a finite state machine such as FSM 115, processors 101 and 102 may be asleep or in another type of dormant state yet be able to receive virtual GPIO signals 135 and messaging signals 136. In this fashion, virtual GPIO architecture 101 not only advantageously economizes the number of pins for each GPIO interface 103 but is also low power.

As used herein, "pin" is a generic term to cover the structure such as a pad or an actual pin that an integrated circuit uses to couple to leads on circuit board or other physical interconnect (e.g., package interconnect or through-hole via interconnect). For example, if each integrated circuit has sixteen GPIO pins or pads 125 as shown in FIG. 1, then these pins could be configured to accommodate eight symmetric GPIO signals 130 (for illustration clarity, only four conventional GPIO signals #1 through #4 are shown in FIG. 1) or sixteen asymmetric GPIO signals 130. In addition, each integrated circuit can accommodate the input/output interfacing of a plurality of n virtual GPIO signals 135 using lines 110a and 110b, wherein n is an arbitrary plural integer. Similarly, each integrated circuit can accommodate the input/output interfacing of a plurality of m messaging signals 136 using lines 110a and 110b, m being a positive plural integer. With regard to each processor core, there is no difference between GPIO signals 130 and virtual GPIO signals 135: they are both simply signals that are transmitted and received as necessary through GPIO interface 103. However, since virtual GPIO signals 135 and messaging signals 136 do not have dedicated pins in contrast to conventional GPIO signals 130, virtual GPIO signals 135 and messaging signals 136 are serialized in FSMs 115 for transmission on lines 110a and 110b. Upon reception, each FSM 115 deserializes the received serialized virtual GPIO signals and the received serialized messaging signals. Thus, each FSM 115 functions as a serializer/deserializer with regard to virtual GPIO signals 135 and messaging signals 136.

A processor may need to receive an interrupt signal in response to changes in selected ones of the GPIO signals or the messaging signals. With respect to virtual GPIO signals 135 and messaging signals 136, a modem power manager (MPM) 140 monitors the selected GPIO signals or messaging signals as programmed through interrupt configuration registers (not illustrated). Each virtual GPIO signal 135 has a corresponding interrupt configuration register. Should a virtual GPIO signal 135 be required to generate an interrupt in response to that signal changing state, the corresponding configuration register would be programmed accordingly. Similarly, should a virtual GPIO signal 135 or messaging signal 136 be one that does not generate an interrupt regardless of whether that signal has changed state, the corresponding interrupt configuration register would also be programmed accordingly. MPM 140 may also comprise a finite state machine. Thus, just like FSM 115, MPM 140 is low power and is active regardless of whether its processor is in a sleep mode or some other dormant state.

Virtual GPIO signals 135 may be subdivided into a transmit set and a receive set. In a symmetric system, each transmit set would have the same number. Similarly, each receive set would have the same number of signals. However, it will be appreciated that virtual GPIO architecture 101 is advantageous in that it can readily accommodate an asymmetric signaling embodiment in which the transmit sets of virtual GPIO signals 135 and messaging signals 136 have different sizes and in which the receive sets of GPIO signals 135 and messaging signals 136 also have different sizes. Regardless of whether architecture 101 is symmetric or asymmetric, each FSM 115 receives the transmit set of virtual GPIO signals 135 in parallel from GPIO interface 103 in the sense that each signal in these transmit sets is carried on its own lead between GPIO interface 103 and FSM 115. The messaging signals are not GPIO signals and thus do not couple through GPIO interface 103. In that regard, the hybrid interface as represented by each FSM 115 may be given some peripheral address by the corresponding processor 101 or 102. Each FSM 115 is configured to decode an address field 137 in messaging signals 136 so that a given messaging signal 136 may be stored in a corresponding messaging register 138. These messaging registers 138 are each mapped to some offset of the general address for FSM 115 within the address space for the corresponding processor 101 or 102. In response to an interrupt from MPM 140, processor 101 or 102 can then access messaging registers 138 to obtain the appropriate messaging signals 136. Just like virtual GPIO signals 135, messaging signals 136 may be subdivided into a transmission set and a receive set. Regardless of whether the architecture is symmetric or asymmetric, the resulting transmission of these transmit sets by FSM 115 takes place over a single transmit pin 112. The transmit set of virtual GPIO signals 135 from one processor becomes the receive set of virtual GPIO signals 135 for the remote processor. Similarly, the transmit set of messaging signals 136 becomes the receive set of messaging signals 136 for the remote processor. The remote processor's FSM 115 then deserializes the receive set of virtual GPIO signals 135 so that they may be presented in parallel to GPIO interface 103.

Each FSM 115 includes configuration registers (not illustrated) that store the previous state for the transmit set of virtual GPIO signals 135 and for messaging signals 136. In this fashion, each FSM 115 can monitor the present state of the transmit set of virtual GPIO signals 135 as received from GPIO interface 103 and only trigger a serial transmission of the corresponding transmit set if the present state has changed with regard to the previous state. In other words, FSM 115 will trigger a serial transmission of a transmit set only if one or more of the signals within the transmit set has changed state as detected through the storage of the previous state in configuration registers 107. Each processor knows the addresses for messaging signal registers 138 and can thus write into them the desired transmit set and also read any changes in the receive set. FSM 115 monitors whether the transmit set of messaging signals 136 has changed with respect to their previous transmission and will trigger a transmission of the transmit set to the remote processor accordingly. MSM 140 monitors whether the receive sets have changed as discussed previously and interrupts the corresponding processor so that the changed receive set may be processed.

Figure 3:
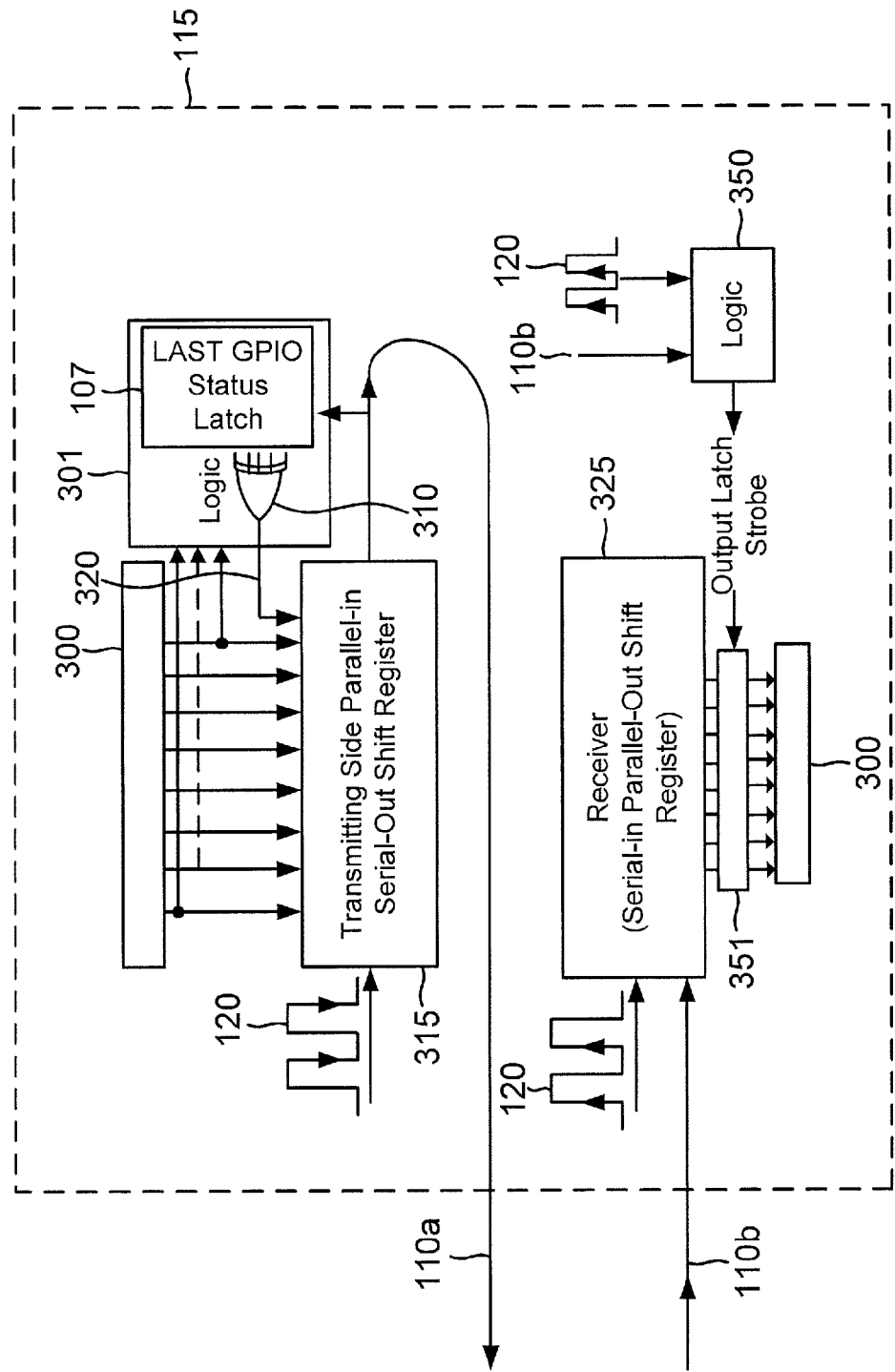
FIG. 3 is a block diagram for a hybrid virtual GPIO finite state machine that responds to an external clock

As discussed above, each FSM 115 acts as a serializer/deserializer to serialize each transmit set and to deserialize each receive set. FIG. 3 is a block diagram of an FSM 115 to better illustrate these operations. FSM 115 exchanges virtual GPIO signals 135 and messaging signals 136 with the corresponding processor through a multiplexing module 300. Multiplexing module interfaces with the corresponding processor through virtual GPIO interface 103 with regard to virtual GPIO signals 135 and interfaces directly with the corresponding processor with regard to messaging signals 136. In one embodiment, each FSM 115 includes a logic circuit 301 that will authorize the transmission of the transmit set of virtual GPIO signals 135 or the transmit set of messaging signals 136 over transmit line 110a only if there has been a change in either transmit set. Logic circuit 301 thus compares the current state for the transmit set of virtual GPIO signals 135 (or messaging signals 136) to the previous state for this set of transmit signals as stored in corresponding configuration registers 107. For example, logic circuit 301 may include an XOR gate 310 to perform this comparison. Multiplexing module 300 loads the transmit set in parallel into a parallel-in-serial-out (PISO) shift register 315. If an enable signal 320 from XOR gate 310 goes high (indicating a change between the current state and the previous state for the transmit set), PISO shift register 315 is enabled to serially shift out its contents onto transmit line 110a responsive to cycles of external clock 120.

FSM 115 also deserializes a receive set of virtual GPIO signals 135 or messaging signals 136 in an analogous fashion using a serial-in-parallel-out (SIPO) shift register 325. The receive set of virtual GPIO signals 135 and messaging signals 136 is generated by the remote processor and transmitted by the remote processor onto receive line 110b. This receive set of virtual GPIO signals 135 (or messaging signals 136) is successively shifted into SIPO shift register 325 responsive to cycles of external clock 120. FSM 115 is configured to transmit the transmit set and to receive the receive set of virtual GPIO signals 135 and messaging signals 136 in frames having a separate start bit and an end bit as discussed further herein.

In one embodiment, FSM 115 may be deemed to comprise a means for receiving a transmit set of virtual GPIO signals from the GPIO interface and for serially transmitting the transmit set of virtual GPIO signals to the remote processor over the dedicated transmit pin, and for retrieving a transmit set of messaging signals from messaging signal registers and for serially transmitting the transmit set of messaging signals to the remote processor over the dedicated transmit pin.

Figure 4:
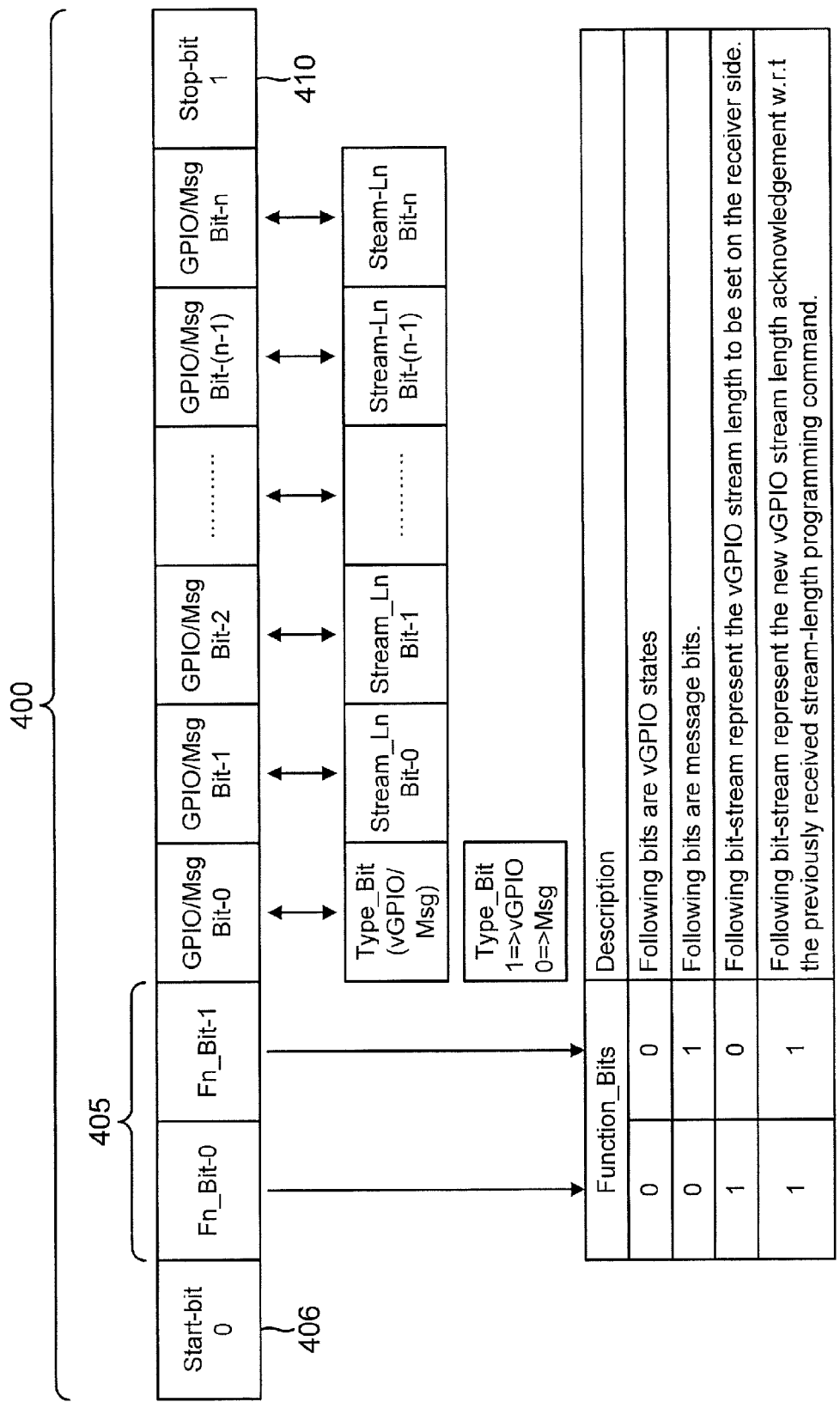
FIG. 4 illustrates the format for a virtual GPIO/messaging signal frame.

The frames have a predefined size. In one embodiment, the frame size is determined by a header to be a certain number of bits long. An example frame 400 is shown in FIG. 4. A header 405 may comprise two function bits, fn_0 and fn_1. In one embodiment, if both function bits are zero, the following bits are virtual GPIO signals 135. If fn_0 is zero and fn_1 equals 1, then the following bits are messaging signals 136. If fn_0 is one and fn_1 equals 0, then the following bits represent the virtual GPIO frame length to be expected by the remote processor. Similarly, if both function bits are one, the following bits represent an acknowledgement by the remote processor of the desired frame length. If the transmit set of virtual GPIO signals 135 (or the transmit set of messaging signals 136) is less than this fixed frame size, the unused bits within each frame may be don't care values. Alternatively, each FSM 115 may be configured to alter the size of the transmitted frames depending upon the number of bits needed for a given application. It will be appreciated that the preceding discussion of coding using two function bits is merely an example and that other headers and coding protocols may be used to identify whether a frame is carrying virtual GPIO signals 135, messaging signals 136, an identification of the virtual GPIO frame length, an acknowledgment of the virtual GPIO frame length, an identification of the messaging signal frame length, or an acknowledgment of the messaging signal frame length. In one embodiment, frame 400 may also include a type bit (type_bit) that is associated with programming and acknowledgement frames as discussed further below. For example, in one embodiment the type bit may be high to identify a virtual GPIO frame and be low to identify a messaging signal frame.

The number of frames requires to send a transmit set of virtual GPIO signal 135 or messaging signals 136 depends upon the number of signals in the particular transmit set and the frame size. For example, suppose the frame size is eight bits and there are ten virtual GPIO signals 135 in a transmit set. To send that transmit set using the eight-bit frames would thus require two frames.

To detect the receipt of a complete frame for the receive set of virtual GPIO signals 135 or messaging signals 136, FSM 115 may include a logic circuit 350 as shown in FIG. 3 that counts the necessary number of cycles for external clock 120 after a receipt of the start bit for the frame. For example, suppose the receive set comprises ten virtual GPIO signals 135 that are received responsive to ten cycles of external clock 120. After detection of the start bit and waiting another ten cycles of external clock 120, logic circuit 350 would then expect receipt of an end bit. Should the end bit be detected accordingly, logic circuit 350 may then strobe an output latch 351 to receive in parallel the receive set of virtual GPIO signals 135 that had been shifted into SIPO shift register 325 as a complete frame. The latched receive set of virtual GPIO signals may then be presented to GPIO interface 103 through multiplexing module 300. Latching of a received set of messaging signals 136 occurs analogously although the received set of messaging signals are loaded into messaging signal registers 138 instead of being routed through GPIO interface 103.

Referring again to PISO shift register 315, it will be appreciated that this register is configured to frame the transmit set of virtual GPIO signals and messaging signals with the start and end bits. The transmit set of virtual GPIO signals is thus transmitted in frame 400 that is demarcated by the start and end bits. Since the transmit set for a transmitting processor becomes the receive set for the remote processor, the receive set is also framed accordingly. This framing is advantageous in that each processor can then monitor the health of the remote processor without needing any additional dedicated pins. For example, each FSM 115 may be configured to weakly pull its dedicated transmit pin 112 (and hence weakly pull transmit line 110a) to a supply voltage during a default state (no change in the current state versus the previous state for the transmit set of virtual GPIO signals). The start bit would be a logical zero for such an embodiment such that FSM 115 grounds transmit line 110a for transmission of the start bit. In this fashion, each FSM 115 may readily detect receipt of the start bit by detecting that receive line 110b has been pulled towards ground. In one embodiment, the start and stop bits are logical complements of each other. The stop bit would thus be a logic high value if the start bit is a logic zero. The payload of the frame may then extend from the type bit to a stop bit 410 that demarcates the frame end.

There is the possibility that a processor has failed such that it inappropriately pulls its transmit line 110a to ground. The remote processor would thus detect this as a start bit and logic circuit 350 would begin counting toward the end of the frame accordingly. But if end bit is a logic one, then each FSM 115 charges transmit line 110a to the supply voltage to signal the end of a frame transmission. If a processor has failed such that the remote FSM 115 has detected what is deemed to be a start bit, logic circuit 350 will not detect the end bit and will notify its processor of the failure of the remote processor accordingly.

To allow sufficient setup time for reception, transmission of frame 400 should take place with regard to a first clock edge and reception with regard to a remaining clock edge. For example, the bits in PISO shift register 315 may be shifted out for transmission on transmit line 110a responsive to the falling edges or negative edges for external clock 120. Conversely, received bits on receive line 110b may be shifted into SIPO shift register 325 responsive to the rising edges or positive edges of clock 120.

For one processor to detect an inactive state in the remote processor, each FSM 115 may be configured to weakly pull its transmit line high in a default state (in which there are no frames to transmit). As discussed previously, the start and stop bits have opposite logical states. A start bit 406 for frame 400 of FIG. 4 may thus be a logic zero (ground) such that transmit line 110a is pulled low for its transmission whereas a stop bit 410 may be a binary one value such that the transmit line 110a is pulled high to a power supply voltage for its transmission. Referring again to FIG. 3, logic circuit 350 is configured to monitor receive line 110b with respect to the rising edges on external clock 120. A default logic state of a no-frame transmission is indicated by receive line 110b simply remaining high because of its weak pull-up as discussed earlier. Should logic circuit 350 detect at one of rising edges for external clock 120 that receive line 110b has been pulled low (indicating the zero value of start bit 405), logic circuit 350 waits for a sufficient number of clock cycles according to the predefined size of frame 400 to then detect the logic high value of stop bit 410. Receipt of stop bit 410 indicates to logic circuit 350 that a complete frame 400 has been fully shifted into SIPO shift register 325. At that point, logic circuit 350 strobes SIPO shift register 325 so that the received frame is provided in parallel to multiplexing module 300 through latch 351. The receive set of virtual GPIO signals (or messaging signals 136) may then be provided to the processor core accordingly through GPIO interface 103.

A relatively slow external clock 120 such as a 32 KHz sleep clock is ample for the signaling requirements of IPC. For example, suppose that the minimum setup and hold requirements for the transmission of virtual GPIO signals 135 and the messaging signals 136 is two nanoseconds each and that the maximum expected lead or lag for receipt of external clock 120 at an FSM 115 is six nanoseconds. It can be readily shown that the resulting maximum frequency for external clock 120 would be 62 MHz. A 32 KHz frequency such as from a sleep clock would thus provide very large margins of safety for such an embodiment. An example method of operation for architecture 101 will now be summarized.

Figure 5:
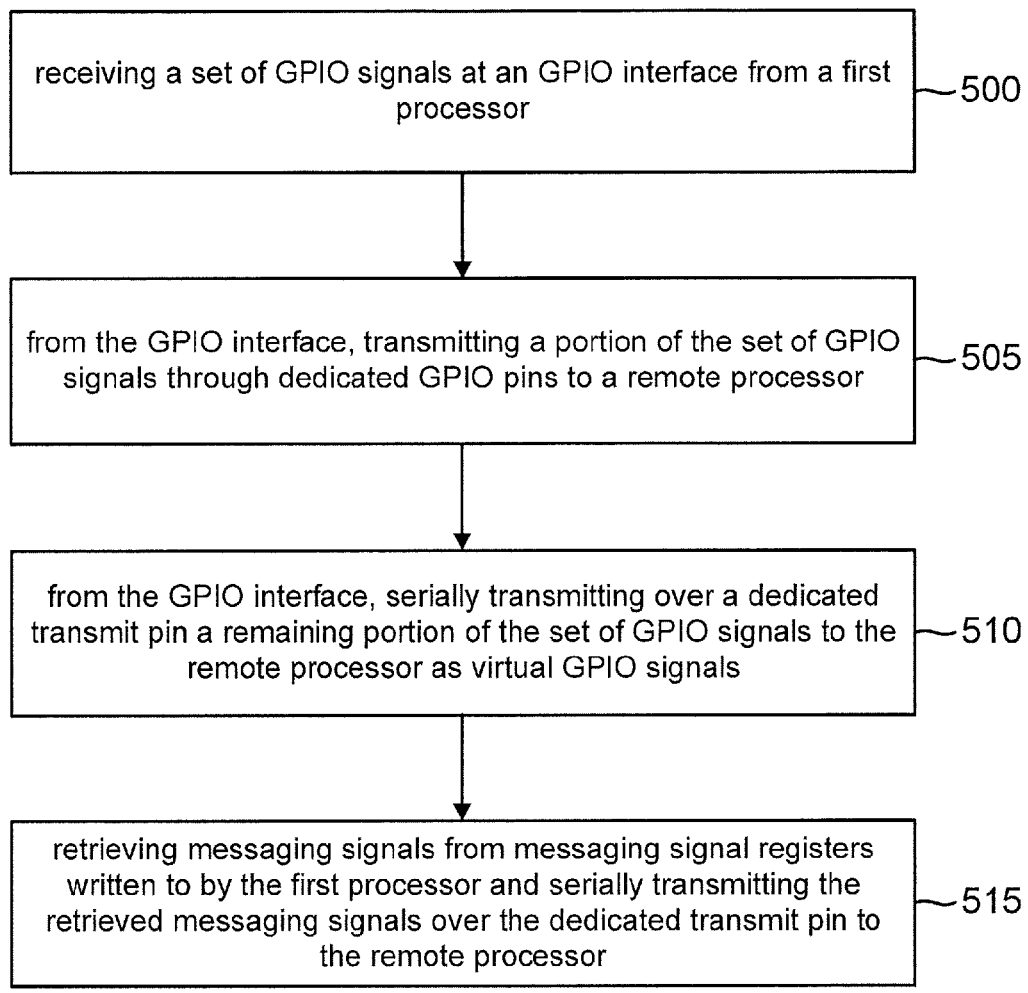
FIG. 5 is a flowchart for a method practiced by the GPIO architecture of FIG. 1.

A method of operation for architecture 101 is summarized in the flowchart of FIG. 5. The method begins with receiving a set of GPIO signals at a GPIO interface from a first processor in a step 500. A step 505 comprises transmitting, from the GPIO interface, a portion of the set of GPIO signals through GPIO pins to a remote processor. A step 510 comprises serially transmitting a remaining portion of the set of GPIO signals from the GPIO interface over a dedicated transmit pin signals to the remote processor as virtual GPIO signals. Finally, the method includes an act 515 of retrieving messaging signals from messaging signal registers written to by the first processor and serially transmitting the retrieved messaging signals over the dedicated transmit pin to the remote processor.

Consider the advantages of the disclosed virtual hybrid GPIO architecture: only two pins are necessary yet any number of virtual GPIO signals 135 and messaging signals 136 can be serialized and deserialized through the finite state machines. The only limit is the timing requirements for the virtual GPIO signals with respect to external clock 120 and any expected amount of clock lag or lead. Moreover, no other pins are necessary to make the health of one processor transparent to the opposing processor.

Figure 6:
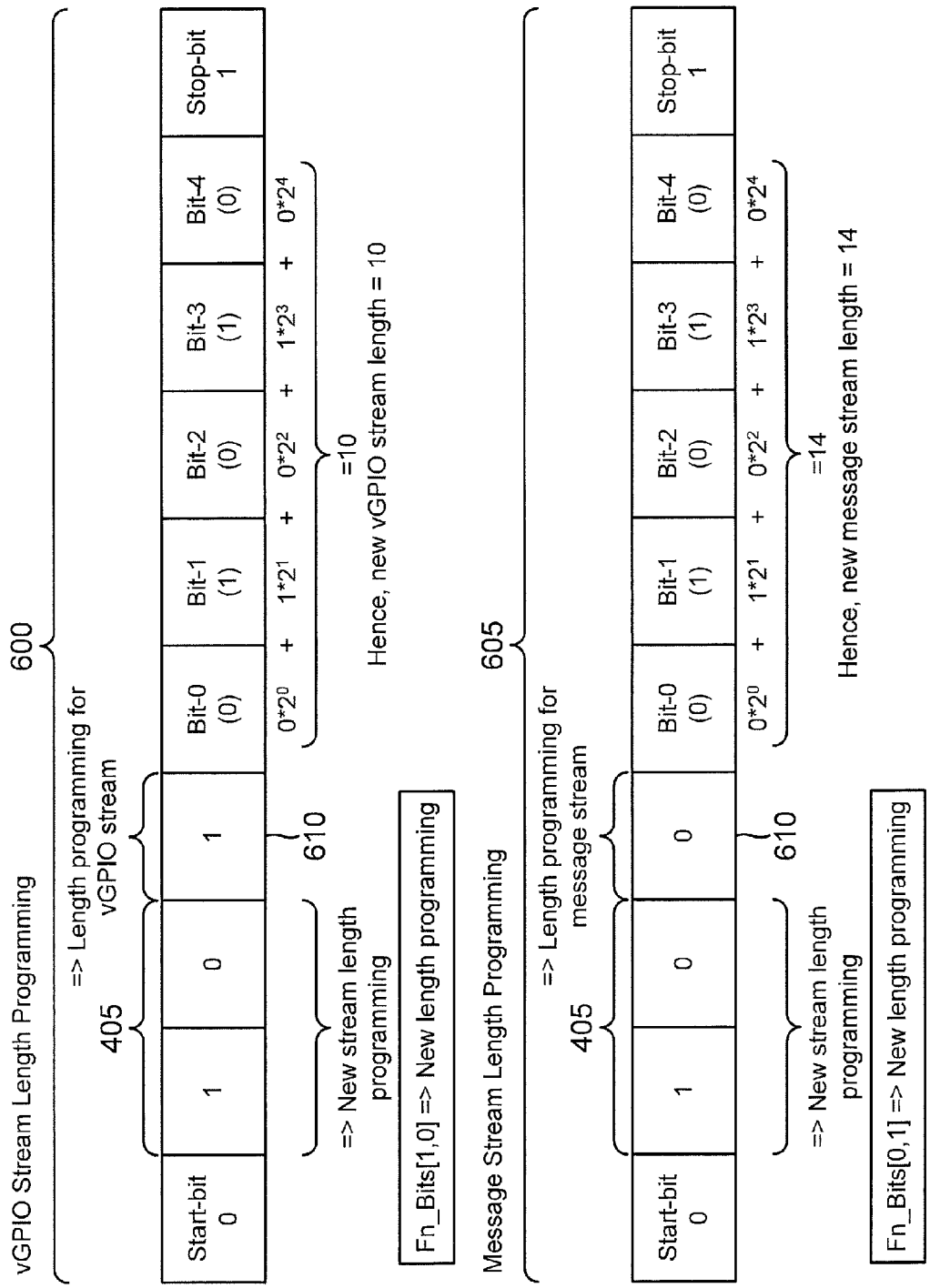
FIG. 6 illustrates length-programming frames used to program the virtual GPIO and messaging frame lengths.

Frame 400 is also quite advantageous in that with just the overhead of as few as two function bits, various messaging signals 136 and virtual GPIO signals 135 may be transmitted over dedicated transmit pin 112. Example programming frames to set the virtual GPIO frame length (and to set the messaging signal frame length) is shown in FIG. 6. A programming frame 600 sets the virtual GPIO frame length. Similarly, a programming frame 605 sets the messaging signal frame length. The number of bits used to define the frame length (and thus the length of each programming frame) is predefined. Thus, once an FSM 115 sees a header indicating that a programming length is being set (such as fn_0 equal 1 and fn_1 equal 0 as discussed previously), then it will read the frame length from the frame body. In that regard, an FSM 115 needs to know whether the length of a virtual GPIO frame or a messaging frame is being programmed. Thus, each header 405 for programming frames 600 and 605 followed by a frame type bit 610. For example, a frame type bit 610 equaling one may signify that a virtual GPIO frame length is being programmed whereas a frame type bit 610 equaling zero may signify that a messaging signal frame length is being programmed. In one embodiment, each programming frame 600 and 605 has five programming bits, ranging from a bit-0 to a bit-4. Each bit is the coefficient for a power of 2 as identified by its name. In other words, bit-0 is the coefficient for multiplying $2^0$, bit-1 is the coefficient for multiplying $2^1$, bit-2 is the coefficient for multiplying $2^2$, bit-3 is the coefficient for multiplying $2^3$, and bit-4 is the coefficient for multiplying $2^4$. The five programming bits can thus program a frame length from zero to 31. An additional programming bit would enable the programming of a frame length up to 63, and so on.

Figure 7:
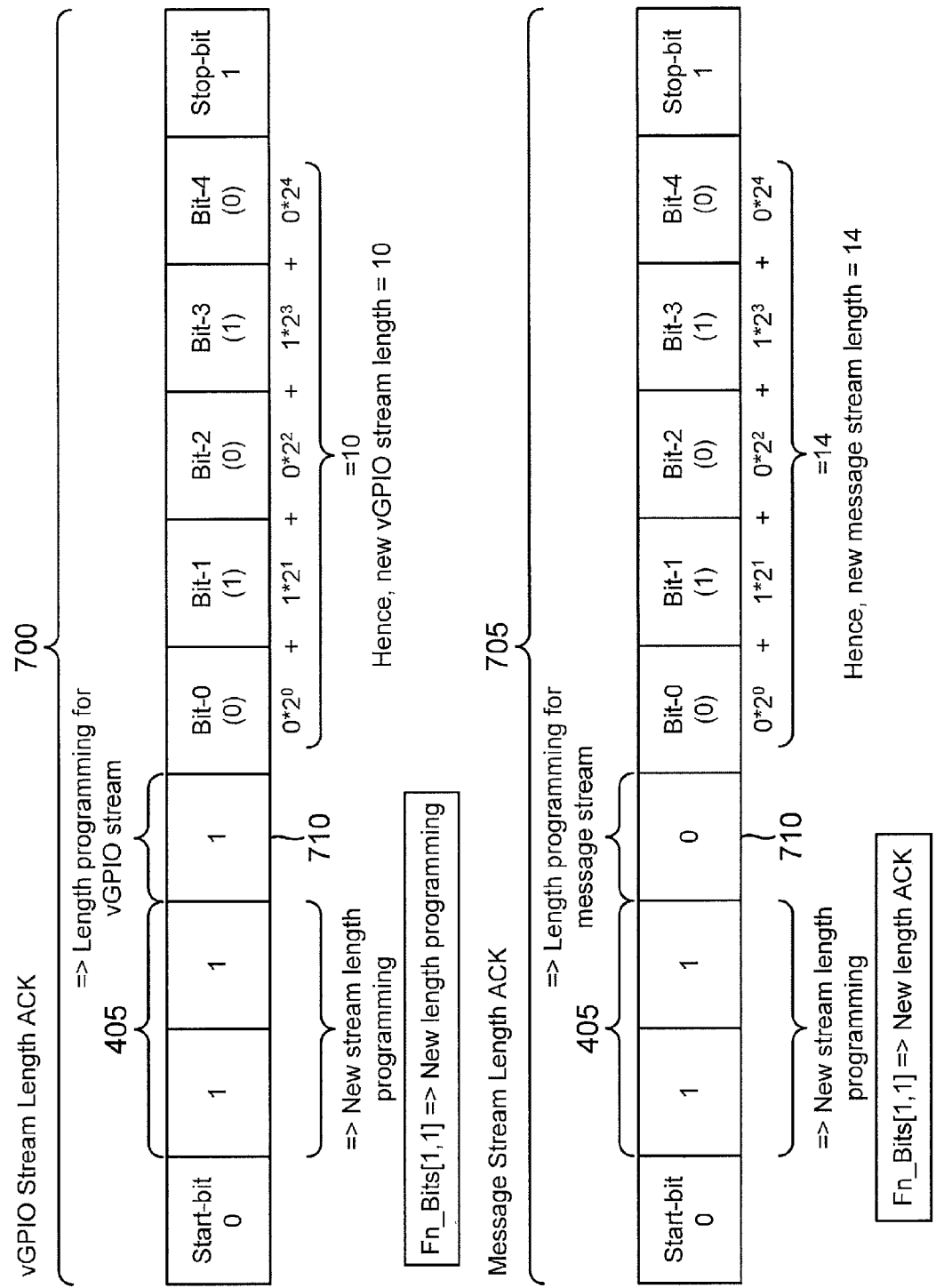
FIG. 7 illustrates acknowledgement frames transmitted to acknowledge the frame lengths programmed in response to the frames of FIG. 6.

When a remote FSM 115 receives a programming frame such as frame 600 or 605, it may proceed to acknowledge the defined frame length using an acknowledgment frame. Example acknowledgement frames are shown in FIG. 7. A frame 700 is a virtual GPIO acknowledgment frame whereas a frame 705 is a messaging signal acknowledgement frame. Each frame 700 and 705 includes a header 405 in which the function bits identify the frame as an acknowledgment frame. In one embodiment, a header 405 in which both function bits are logic ones identifies an acknowledgment frame. A frame type bit 710 following header 405 identifies the acknowledgment frame type. In one embodiment, a virtual GPIO acknowledgment frame 700 is identified by frame type bit 710 equaling a logic one. Conversely, a messaging signal acknowledgment frame 705 may be identified by a frame type bit 710 equaling logic zero. The programming bits following the frame type bit 710 equal the programming bits in corresponding frames 600 or 605.

Figure 8:
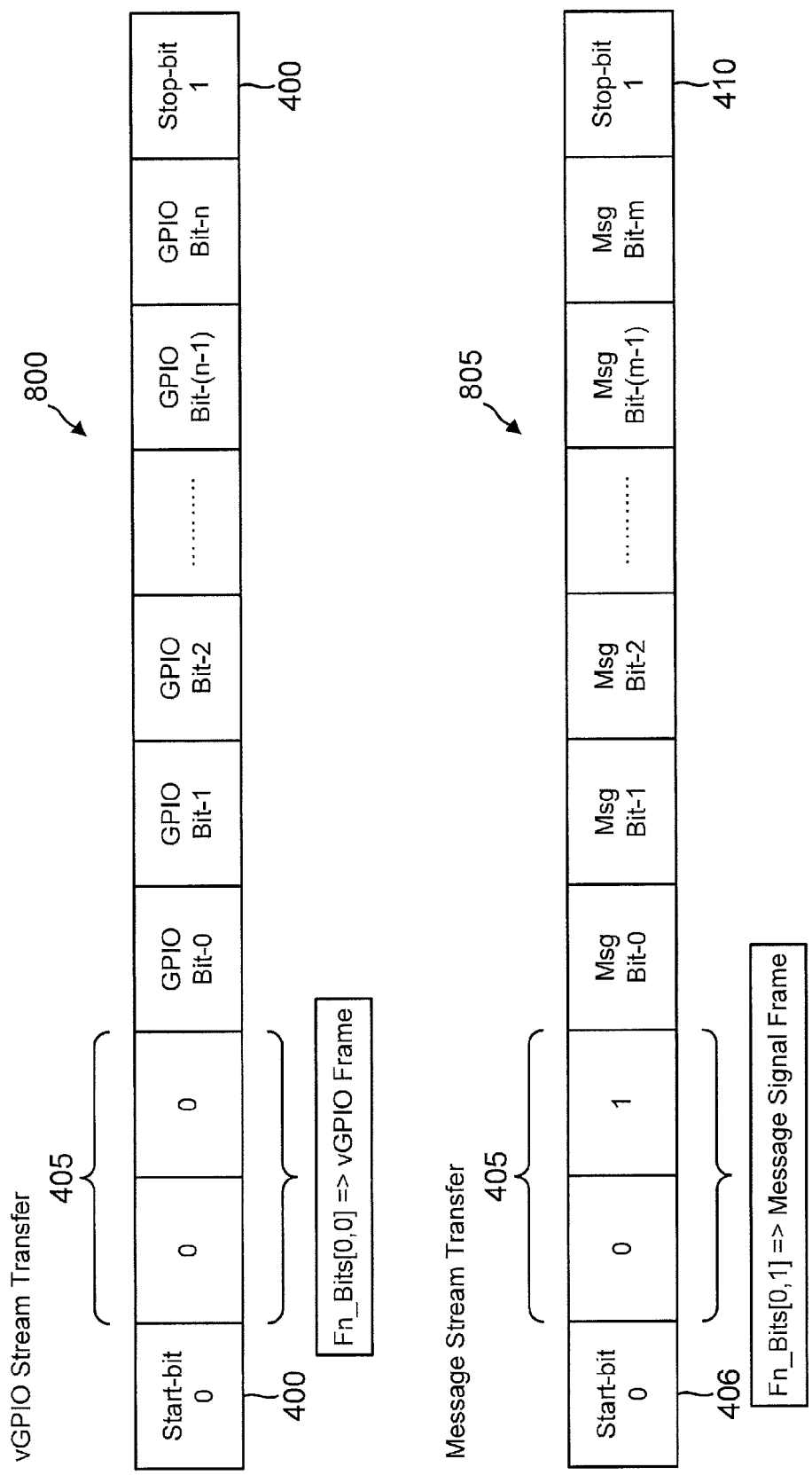
FIG. 8 illustrates an example virtual GPIO frame and an example messaging signal frame.

Once the frame lengths are thus programmed, a frame 800 of virtual GPIO signals 136 or a frame 805 of messaging signals may be transmitted as shown in FIG. 8. Referring again to FIG. 1, note that there are n virtual GPIO signals 135 and m messaging signals 136. Each frame 800 could thus be dedicated to just one GPIO port (one of the n GPIO signals 135) or it could include one bit each from the n GPIO signals 135. In other words, one could serially transmit GPIO words according to the various ports or they could be transmitted in parallel. The same serial/parallel consideration applies to the messaging signals. Regardless of whether each frame 800 and 805 is carrying multiple ports or just one, header 405 identifies whether the frame is a virtual GPIO frame or a messaging signal frame.

Figure 9:
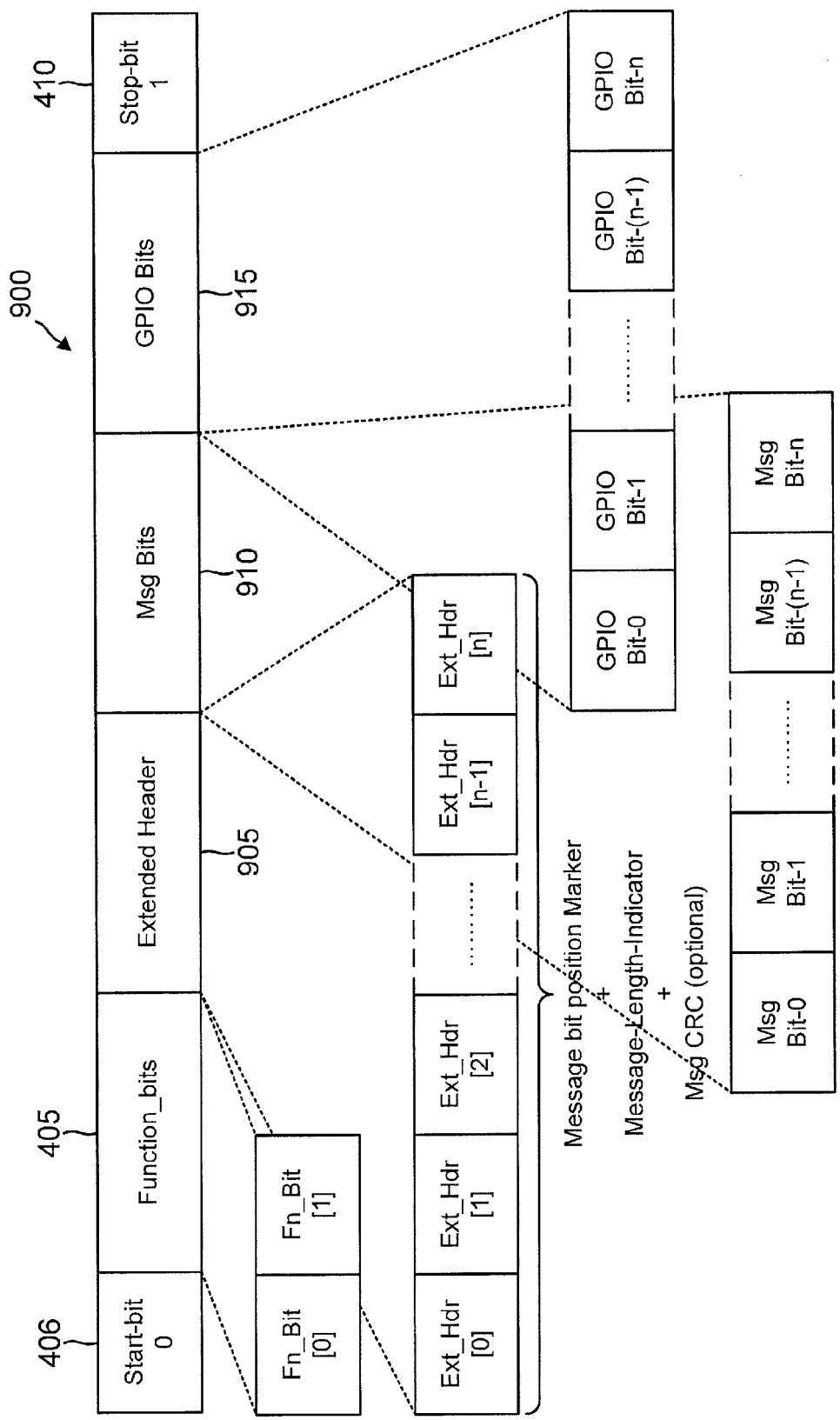
FIG. 9 illustrates an example combined virtual GPIO and messaging frame.

Rather than use separate frames to transmit the virtual GPIO signals 135 and messaging signals 136, these signals may be combined in an alternative embodiment for a hybrid virtual GPIO architecture in which each frame includes both virtual GPIO signals 135 and messaging signals 136. For example, FIG. 9 shows an example hybrid frame 900 that includes header 405 as well as an extended header 905. Extended header 905 indicates the bit position of the messaging signal bits and the virtual GPIO bits following extended header 905 and before stop bit 410. Depending upon the latency requirements, either the messaging bits 910 or the virtual GPIO bits 915 may be first in the frame body. In some embodiments, extended header 905 may include error correction bits such as CRC bits, Note that extended header 912 need merely identify the position and length of just the virtual GPIO bits 915 or just the messaging bits 910 since the remaining bits are thus known by default to belong to the remaining bit category.

Use of a common external clock 120 as discussed above is conveniently simple to implement but requires that each FSM 115 associate with a clock pin for receiving common clock 120. To avoid this additional pin demand, external clock 120 may be eliminated as discussed in U.S. Provisional No. 61/907,974, the contents of which are incorporated by reference herein. Referring again to FIG. 1, architecture 101 would thus be modified by eliminating external clock 120 and its corresponding pins. To eliminate any need for reserving a pin in each integrated circuit for receiving common clock 120, the transmission of a transmit set of signals is asynchronous with regard to the transmitting integrated circuit and the receiving integrated circuit. To enable this advantageous asynchronous transmission and reception, each FSM 115 may include or associate with an oscillator such as a ring oscillator. The transmitting FSM pulse-width modulates the transmitted signal over the dedicated transmit pin responsive to each bit in the transmit set by counting the oscillations from the oscillator. The bits in the transmit set are then transmitted in frames of data, each bit in the frame being a pulse-width-modulated version of the corresponding bit in the transmit set. Each bit in the transmitted frame of data has a certain bit period that is used with respect to the pulse-width modulation. For example, if a transmit bit has one binary state such as a binary zero, the FSM may count a first number of oscillations so that a majority fraction of the bit period has expired. Upon counting the first number of oscillations, the FSM pulses the dedicated transmit pin with a first binary voltage such as with a power supply voltage VDD. At the start of the count, the dedicated transmit pin is pulsed in an opposite second binary voltage state such as ground.

Conversely, if a transmit bit has an opposite binary state such as a binary one, the FSM begin the transmit bit with second binary voltage such as ground and proceed to count a second number of oscillations so that a minority fraction of the bit period has expired. Upon counting the second number of oscillations, the FSM pulses the dedicated transmit pin with the first binary voltage. In this fashion, the voltage of the transmit line coupled to the dedicated transmit pin is pulsed with the first binary voltage according to a variable pulse width. If the current transmit bit has a first binary value, the transmit line is pulsed with the first binary voltage according to a first pulse width. Conversely, if the current transmit bit has an opposite second binary value, the transmit line is pulsed with the first binary voltage according to a second pulse width.

The receipt at an FSM over its dedicated receive pin of a transmitted frame of data from a remote processor is demodulated in an analogous fashion. It is convenient for the default state (or idle mode) of each transmit line (which is the receive line for a receiving processor) to be charged to a power supply voltage VDD. This makes the health of the remote processor transparent to the receiving processor as discussed further below. The second binary voltage in such embodiments would then be ground. The receiving FSM would then recognize the start of a received bit by detecting when the dedicated receive pin is discharged. The receiving FSM may then begin counting oscillations from its oscillator. Two counts would then be generated: a first receive count of how many oscillations occur during the bit fraction in which the dedicated receive pin is charged to the first binary voltage, and a second receive count of how many oscillations occur during the bit fraction in which the dedicated receive pin is charged to the second binary voltage. By comparing the two receive counts, the receiving FSM may determine whether the first pulse width or the second pulse width was applied to the received bit. The received frame of data is demodulated accordingly such that no common clock is required to coordinate the transmission of the frames of data over the transmit lines. To distinguish such an FSM from FSM 115 that uses an external clock, the following FSM will be denoted as an internal-clock FSM.

Figure 10:
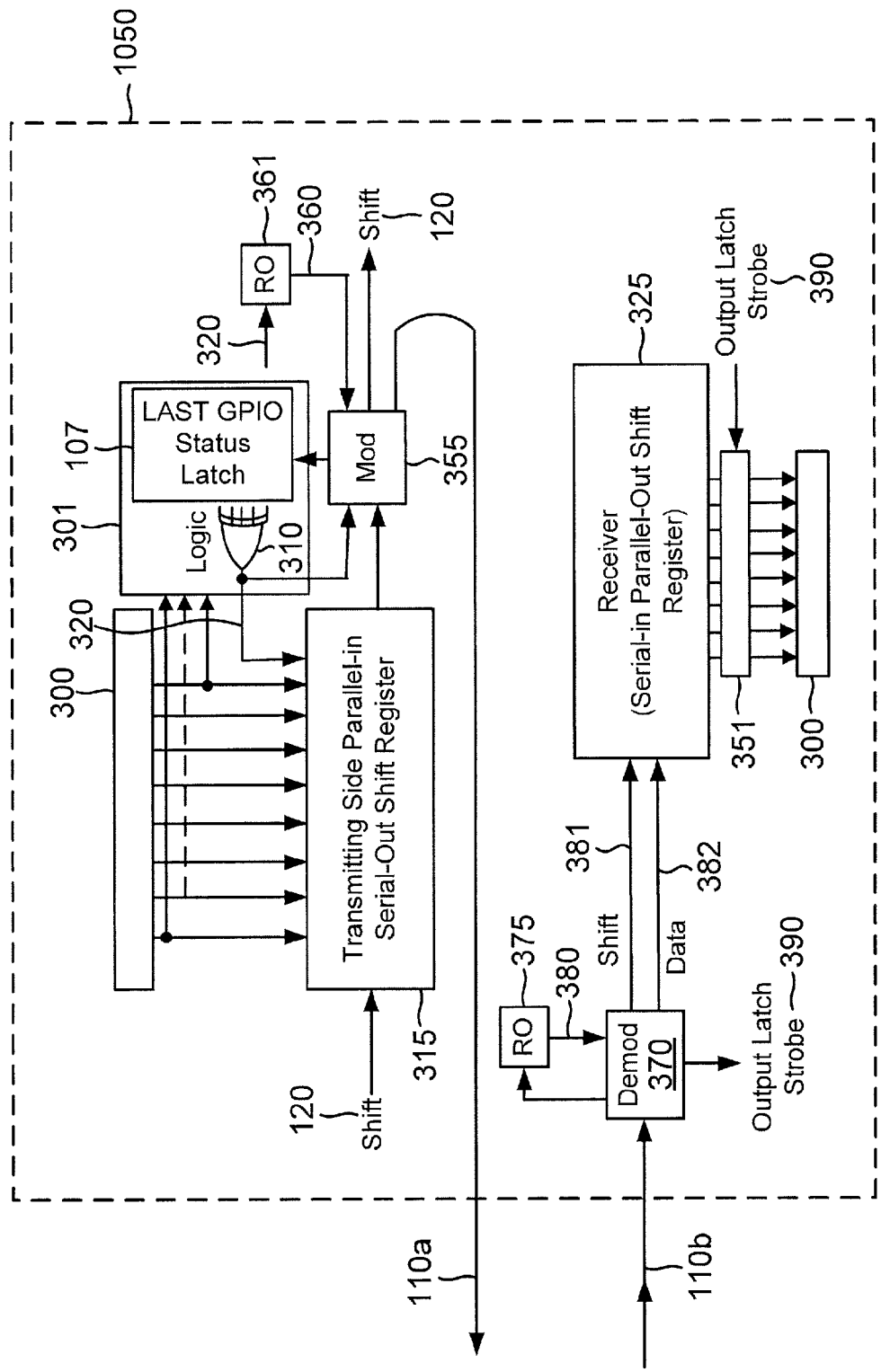
FIG. 10 illustrates a hybrid virtual GPIO finite state machine that does not use an external clock.

FIG. 10 is a block diagram of an internal-clock FSM 1015 to better illustrate its transmit and receive operations. FSM 1015 receives a transmit set of virtual GPIO signals 135 from its GPIO interface 103 (shown in FIG. 1) through a multiplexing module 300. Alternatively, multiplexing module 300 may receive a transmit set of messaging signals 136 as discussed earlier with regard to FSM 115. FSM 1015 includes logic circuit 301 that will authorize the serial transmission of the transmit set of signals as pulse-width modulated signals over transmit line 110a if there has been a change in the transmit set as compared to a previous state of the transmit set. In this fashion, there is no unnecessary re-transmission of a transmit set that has not changed state as compared to a previous transmission. Logic circuit 301 thus compares the current transmit set of virtual GPIO signals to the previous transmit set stored in a latch or configuration register 107. To perform the comparison, logic circuit 301 may include an XOR gate 310 that XORs the current transmit set with the previous transmit set stored in configuration registers 107 (this previous transmit set may be designated as the "LAST GPIO Status" as shown in FIG. 2). Multiplexing module 300 loads the current transmit set in parallel into parallel-in-serial-out (PISO) shift register 315. If an enable signal 320 from XOR gate 310 goes high (indicating a change between the current transmit set and that stored in registers 107), PISO shift register 315 is then enabled to serially shift out its contents onto transmit line 110a responsive to a shift signal 120.

Each transmit set of signals comprises a frame of data that is stored in PISO shift register 315. FSM 1015 includes a pulse-width modulator 355 that pulse-width modulates the transmit set of bits shifted out from PISO shift register 315 into a pulse-width-modulated output signal that is driven to the remote processor on transmit line 110a. This modulation is responsive to counts of oscillation cycles from an oscillator such as the counts of a transmit ring oscillator output signal 360 from a transmit ring oscillator (RO) 361. Modulator 355 and transmit ring oscillator 361 may be triggered by the assertion of enable signal 320 from XOR gate 310. Responsive to this triggering, modulator 355 strobes shift signal 120 so that PISO shift register 315 shifts an initial bit of the transmit set of signals to modulator 355.

Modulator 355 includes at least one counter (e.g., counters 1105 and 1110 shown in FIG. 11 described further below) that counts the cycles in ring oscillator output signal 360. Depending upon the desired pulse width from the pulse width modulation, the counter either counts to a first count or to a second count that is greater than the first count. After counting a sufficient number of cycles to satisfy the appropriate one of the first and second counts, the counter re-strobes shift signal 120 so that a subsequent bit from the frame of data stored in PISO shift register 315 is shifted into modulator 355. In this fashion, the transmit set of signals for a frame of data stored in PISO shift register 315 is shifted a bit at a time into modulator 355. Depending upon the binary value of each bit that is shifted out of PISO shift register 315, pulse-width modulator 355 pulse-width modulates a corresponding pulse transmitted over transmit line 110a. In that regard, each processor may be configured to weakly charge its transmit line 110a high to a power supply voltage VDD during a default state (no data transmission). In such an embodiment, the pulse transmission for a bit time period begins with discharging transmit line 110a to ground (VSS) as shown in the timing diagram of FIG. 11 for a frame of data. Each pulse-width-modulated bit transmission begins with the discharging of transmit line 110a to ground by some initial discharge fraction of the bit period such as 25% of the bit time period. Depending upon the bit value, modulator 355 either maintains the discharge of transmit line 110a for a majority of the bit period (e.g., 75%) or charges transmit line 110a back to VDD immediately after expiration of the initial discharge fraction of the bit period. In other words, one binary value may be modulated into a relatively narrow pulse of high voltage (VDD) in a bit period whereas a complement of the binary value may be modulated into a relatively wide pulse of high voltage (VDD) in a bit period.

Figure 11:
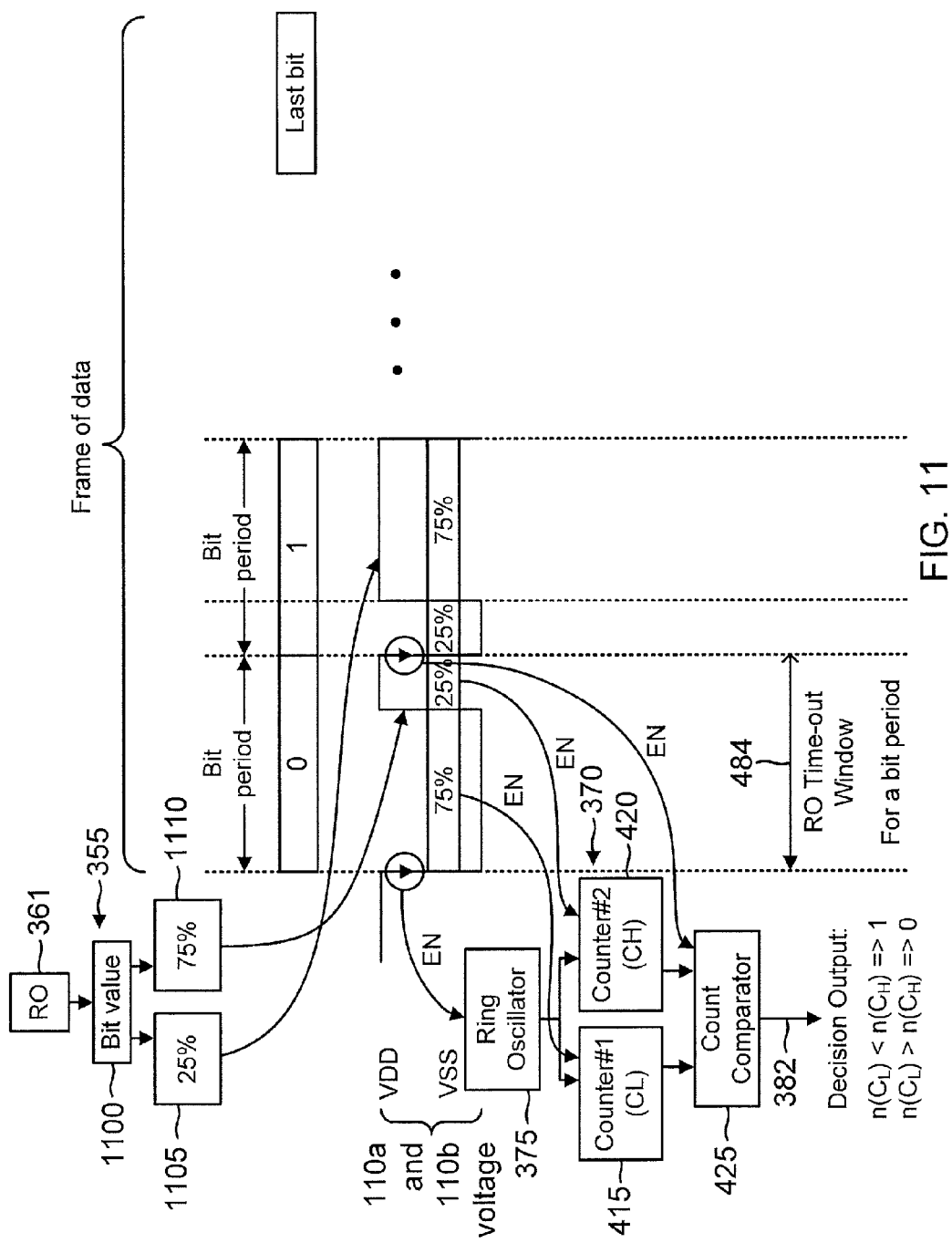
FIG. 11 is a timing diagram for the transmission of a frame of data through the finite state machine of FIG. 10.

The initial bit of the example data frame shown in FIG. 11 is a binary zero. In one embodiment, a binary zero may be modulated into a first pulse width in which transmit line 110a is maintained at ground for 75% of the bit period. Such a majority fraction of the bit period corresponds to a majority fraction counter 1110 counting to the second count. If the bit to be transmitted is a binary zero, pulse-width modulator 355 would thus keep transmit line 110a discharged until the second count is satisfied. When the second count is reached, pulse-width modulator 355 would then pulse transmit line 110a to the power supply voltage VDD for the remainder of the bit period. This pulse duration would then correspond to a minority fraction counter 1105 counting to the first count, which is just 25% of the bit period. The resulting voltage pulse transmitted over transmit line 110a for such a bit would then have a pulse width of just 25% of the bit period.

Conversely, a binary one may be modulated into a second pulse width in which transmit line 110a is grounded only during a minority discharge fraction such as the first 25% of the bit period. Transmit line 110a would then be discharged until the first count is satisfied. Once the first count is satisfied, pulse-width modulator 355 would then pulse transmit line 110a high to the power supply voltage VDD for the remainder of the bit period as determined by resetting majority fraction counter 410 to zero and counting until it satisfies the second count. The second pulse width during which the voltage for transmit line 110a is charged to the power supply voltage VDD would then comprise 75% of the bit period. It will appreciated, however, that different pulse widths may be used in alternative embodiment to signify the desired binary values.

In one embodiment, modulator 355 may comprise a logic circuit 1100. Depending upon the bit value, logic circuit 1100 either triggers minority fraction counter 1105 or majority fraction counter 1110 to begin counting. It will be appreciated, however, that a single counter may be used that counts to either the first or second count depending upon the desired pulse-width modulation. Upon triggering by logic circuit 1100, minority fraction counter 1105 or majority fraction counter 1110 counts the cycles from transmit ring oscillator (RO) 361. For example, minority fraction counter 1105 may be configured to count a sufficient number of cycles corresponding to 25% of the bit time period whereupon it asserts an output signal to signify that the first count is satisfied. Similarly, majority fraction counter 1110 may be configured to count a sufficient number of cycles corresponding to 75% of the bit time period whereupon it asserts its output signal. In this embodiment, modulator 355 is configured to discharge transmit line 110a to ground at the start of each bit time period. Depending upon the bit value, modulator 355 will charge transmit line 110a back to the power supply voltage VDD upon on the assertion of the output signal from the appropriate counter. For example, the first bit in the data frame is a binary zero so modulator 355 asserts transmit line 110a high to VDD upon counter 1105 asserting its output signal. Similarly, the second bit in the data frame is a binary one so modulator 355 asserts transmit line 110a high to VDD upon counter 1110 asserting its output signal. It will be appreciated that initial 25% low period is just an example and that other fractions of the bit time period may be implemented.

In one embodiment, the combination of logic circuit 41100, counters 1105 and 1110, modulator 355, and SIPO shift register 315 may be deemed to comprise a means for serially processing each signal in the transmit set into a series of corresponding pulse-width-modulated signals, wherein the means is configured to determine a pulse width for each serially processed signal by counting oscillations from an oscillator into one of a first count and a second count responsive to a binary value of the serially processed signal, and wherein the means is further configured to transmit the series of corresponding pulse-width-modulated signals through a dedicated transmit pin to a remote processor over the dedicated transmit pin.

Referring again to FIG. 9, FSM 1015 also deserializer a receive set of signals (virtual GPIO and/or messaging signals) in an analogous fashion using serial-in-parallel-out (SIPO) shift register 325. A demodulator 370 demodulates a received pulse-width-modulated signal from a remote processor as received on receive line 110b. Demodulator 370 is configured to detect the start of a received frame of data from the received pulse-width-modulated signal such as by detecting the discharge of receive line 110b to trigger a receive ring oscillator 375 to begin oscillating a receive ring oscillator output signal 380. Note that in alternative embodiments, oscillators 375 and 361 may comprise the same oscillator. Analogous to modulator 355, demodulator 370 may include a counter such as a low counter 415 and a high counter 420. In each bit period, low counter 415 is triggered to count while receive line 110b is discharged. Conversely, high counter 420 is triggered to count while receive line 110b is charged to the power supply voltage VDD. In alternative embodiments, counters 415 and 420 may be implemented using a single common counter that counts the number of oscillations in each binary voltage state for receive line 110b. By comparing the counts from counters 415 and 420, demodulator 370 may form a demodulated data signal 382 accordingly. In particular, if the count from high counter 420 is greater than the count from low counter 415 in a given bit period, demodulator 370 may drive demodulated data signal 382 high to the power supply voltage VDD to signify that a relatively wide pulse was received. Conversely, if the count from low counter 415 is greater, demodulator 370 may discharge demodulated data signal 382 to VSS to signify that a relatively narrow pulse was received.

Demodulator 370 may also assert a shift signal 381 to SIPO shift register 325 upon detection from the counts of the bit time period boundaries. SIPO shift register 325 would then shift in demodulated data signal 382 from demodulator 370. FSM module 1015 may be configured to process a predefined data frame size for the transmit and receive sets of signals as determined by the programming frames discussed above. Both counters 415 and 420 are initialized at the start of a bit time period. Low counter 415 counts the cycles from receive ring oscillator 375 while the receive line 110b voltage is low whereas high counter 420 counts the cycles from receive ring oscillator 375 while receive line voltage is high (VDD). Comparator 425 thus performs the demodulation bit decision at the end of each bit time period by comparing a low count ($C_L$) from low counter 415 to a high count ($C_H$) from high counter 420. The bit periods may be determined from whenever high counter 420 stops counting and outputs $C_H$ as triggered by receive line 110b being discharged. Counter 420 may be initialized at each bit time boundary accordingly. At the end of each bit period, if $C_L$ is greater than $C_H$, comparator 425 drives demodulated data signal 382 low, corresponding to the demodulation of a binary zero in one embodiment. Conversely, if $C_H$ is greater than $C_L$ at the end of a bit period, comparator drives demodulated data signal 382 high, corresponding to the demodulation of a binary one in such an embodiment. SIPO shift register 325 registers each demodulated bit decision responsive to a strobe of shift signal 381.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:
1. An integrated circuit, comprising:
a first processor;
a plurality of messaging signal registers, wherein the first processor is configured to write a transmit set of messaging signals into the messaging signal registers;
a plurality of GPIO pins;
a GPIO interface configured to receive a first set of signals from the first processor and to transmit a portion of the first set of signals as GPIO signals to a remote processor over the plurality of GPIO pins;
a dedicated transmit pin; and a finite state machine (FSM) configured to receive a remaining portion of the first set of signals from the GPIO interface and to serially transmit the remaining portion as a transmit set of virtual GPIO signals to the remote processor over the dedicated transmit pin, and wherein the FSM is further configured to retrieve a transmit set of messaging signals from the messaging signal registers and to serially transmit the transmit set of messaging signals to the remote processor over the dedicated transmit pin.

2. The integrated circuit of claim 1, further comprising: a dedicated receive pin, wherein the FSM is further configured to serially receive a receive set of virtual GPIO signals from the remote processor over the dedicated receive pin and to provide the receive set of virtual GPIO signals to the GPIO interface.

3. The integrated circuit of claim 2, wherein the GPIO interface is further configured to receive a receive set of GPIO signals from the GPIO pins and to transmit the receive set of GPIO signals to the first processor.

4. The integrated circuit of claim 1, wherein the first processor comprises an application processor.

5. The integrated circuit of claim 1, wherein the first processor comprises a modem processor.

6. The integrated circuit of claim 2, wherein the FSM comprises a parallel-in-serial-out (PISO) shift register and a serial-in-parallel-out (SIPO) shift register.

7. The integrated circuit of claim 2, wherein the FSM is further configured to serially transmit the transmit set of virtual GPIO signals and the transmit set of messaging signals in frames, each frame being demarcated by a start bit and an end bit.

8. The integrated circuit of claim 7, wherein the FSM is further configured to detect a failure of the remote processor by a detection of a failure to receive the end bit for one of the frames.

9. The integrated circuit of claim 3, wherein the FSM is further configured to serially transmit the transmit set of virtual GPIO signals and the transmit set of messaging signals responsive to cycles of an external clock.

10. The integrated circuit of claim 9, wherein the FSM is further configured to serially transmit the transmit sets of signals responsive to first clock edges of the external clock and to serially receive the receive sets of signals responsive to second clock edges of the external clock.

11. The integrated circuit of claim 3, wherein the FSM is further configured to serially transmit the transmit sets of signals as pulse-width-modulated signals.

12. The integrated circuit of claim 11, wherein the FSM includes an oscillator and at least one counter to count oscillations from the oscillator, and wherein the FSM is further configured to determine a pulse width for each pulse-width-modulated signal responsive to a count from the at least one counter.

13. The integrated circuit of claim 12, wherein the oscillator is a ring oscillator.

14. The integrated circuit of claim 11, wherein the FSM is further configured to generate each pulse-width-modulated signal to either have a first pulse width or a second pulse width, wherein the second pulse width is greater than the first pulse width.

15. A method, comprising:
receiving a set of GPIO signals at an GPIO interface from a first processor;
transmitting a portion of the set of GPIO signals through dedicated GPIO pins to a remote processor;
serially transmitting over a dedicated transmit pin a remaining portion of the set of GPIO signals to the remote processor as virtual GPIO signals; and
retrieving messaging signals from messaging signal registers written to by the first processor and serially transmitting the retrieved messaging signals over the dedicated transmit pin to the remote processor.

16. The method of claim 15, further comprising:
serially receiving a receive set of virtual GPIO signals from the remote processor over a dedicated receive pin;
serially receiving a receive set of GPIO signals from the remote processor over the dedicated GPIO pins; and
providing the receive set of virtual GPIO signals and the receive set of GPIO signals to the first processor through the GPIO interface.

17. The method of claim 16, further comprising:
serially receiving a receive set of messaging signals from the remote processor over the dedicated receive pin;
writing the receive set of messaging signals into the messaging signal registers according to addresses for the receive set of messaging signals; and
from the first processor, retrieving the receive set of messaging signals from the messaging signal registers.

18. The method of claim 17, wherein serially transmitting the virtual GPIO signals and the retrieved messaging signals is responsive to cycles of an external clock.

19. The method of claim 17, wherein serially transmitting the virtual GPIO signals and the retrieved messaging signals comprises pulse-width-modulating a transmitted signal over the dedicated transmit pin.

20. An integrated circuit, comprising:
a first processor;
a plurality of messaging signal registers, wherein the first processor is configured to write a transmit set of messaging signals into the messaging signal registers;
a plurality of GPIO pins;
a GPIO interface configured to receive a first set of signals from the processor and to transmit a portion of the first set of signals as GPIO signals to a remote processor over the plurality of GPIO pins;
a dedicated transmit pin; and
a means for receiving a remaining portion of the first set of signals from the GPIO interface and for serially transmitting the remaining portion as a transmit set of virtual GPIO signals to the remote processor over the dedicated transmit pin, and for retrieving a transmit set of messaging signals from the messaging signal registers and for serially transmitting the transmit set of messaging signals to the remote processor over the dedicated transmit pin.

21. The integrated circuit of claim 20, wherein the means is configured to serially transmit the transmit sets responsive to cycles of an external clock.

22. The integrated circuit of claim 20, further comprising an oscillator; and wherein the means is configured to serially transmit the transmit sets as pulse-width-modulated signals responsive to counts of oscillations from the oscillator.

* * * * *